United States Patent [19]

Köhler et al.

[11] Patent Number: 5,548,011
[45] Date of Patent: Aug. 20, 1996

[54] BLENDS OF POLYCARBONATES, DIMERIC FATTY ACID POLYESTERS AND PIB RUBBERS, SILICONES OR MINERAL OILS

[75] Inventors: Burkhard Köhler, Leverkusen; Wolfgang Ebert, Krefeld; Klaus Horn, Dormagen; Richard Weider, Leverkusen; Thomas Scholl, Bergisch Gladbach, all of Germany

[73] Assignee: Bayer AG, Leverkusen, Germany

[21] Appl. No.: 522,126

[22] Filed: Aug. 31, 1995

[30] Foreign Application Priority Data

Sep. 12, 1994 [DE] Germany .................. 44 32 379.4

[51] Int. Cl.⁶ .................. C08L 69/00; C08L 67/08
[52] U.S. Cl. .................. 524/267; 524/508; 525/133; 525/146; 525/439
[58] Field of Search .................. 524/267, 508; 525/133, 146, 439

[56] References Cited

U.S. PATENT DOCUMENTS 4,335,032  6/1982  Rosenquist .................. 524/269
5,045,586  9/1991  O'Lenick .................. 524/291

FOREIGN PATENT DOCUMENTS 0108996  5/1984  European Pat. Off. .
2842005  4/1980  Germany .
3506472  8/1986  Germany .
4132079  4/1993  Germany .
2057464  4/1981  United Kingdom .

OTHER PUBLICATIONS

Orbit Abstract of DE 41 32 079 (Apr. 1, 1993).
Database WPI, Week 9438, Derwent Publications Ltd., London, GB; AN 94–308839 & KR–B–9 310 235 (Kolon Ind Inc), Oct. 15, 1993.
Database WPI, Week 9333, Derwent Publications Ltd., London, GB; AN 93–261824 & JP–A–05 179 128 (Kanebo Ltd), Jul. 20, 1993.
Orbit Abstract of DE 35 06 472 (Aug. 28, 1986).
Orbit Absract of DE 28 42 0005 (Apr. 10, 1980).

*Primary Examiner*—David Buttner
*Attorney, Agent, or Firm*—Connolly & Hutz

[57] ABSTRACT

The invention relates to blends of polycarbonates, branched, phenolic hydroxy functional dimeric fatty acid polyesters and at least one component selected from polyisobutylene, silicones and mineral oils.

4 Claims, No Drawings

BLENDS OF POLYCARBONATES, DIMERIC FATTY ACID POLYESTERS AND PIB RUBBERS, SILICONES OR MINERAL OILS

The invention relates to blends of polycarbonates, branched, phenolic hydroxy functional dimeric fatty acid polyesters and at least one component selected from polyisobutylene, silicones and mineral oils. These mixtures are very tough at low temperatures.

Accordingly, the invention provides mixtures containing

A) 65–96.5, preferably 80–95 wt. % of aromatic polycarbonate,

B) 0.5–20, preferably 1–10 wt. % of phenolic hydroxy functional branched dimeric fatty acid polyester, and at least one component selected from C) 1–25, preferably 4–10 wt. % of polyisobutylene, D) 1–25, preferably 4–10 wt. % of silicone oil, E) 1–25, preferably 4–10 wt. % of mineral oil, wherein the sum of A+B+C+D+E is 100.

Component A)

Thermoplastic polycarbonates in accordance with component A) which are suitable for the invention may be either homo or copolycarbonates of diphenols of the formula (I)

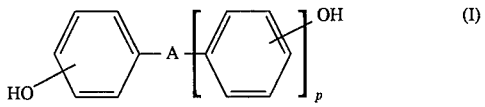

in which p is 1 or zero and

A may be a single bond, a $C_1$–$C_5$-alkylene or $C_2$–$C_5$-alkylidene group or a $C_5$–$C_6$-cycloalkylidene group optionally substituted by methyl groups, —O—, —S— or —$SO_2$—.

Polycarbonates in accordance with component A) may be either linear or branched, they may contain aromatically bonded methyl groups and contain no halogens. Polycarbonates for component A) may be used either on their own or as a mixture.

Diphenols of the formula (I) are either known from the literature or can be prepared by processes known from the literature. Preparation of polycarbonates in accordance with component A) which are suitable according to the invention is also known from the literature and may take place, for instance, using phosgene by the phase boundary method or using phosgene by a process in a homogeneous phase (the so-called pyridine method), wherein the molecular weight being set each time is produced by a corresponding amount of known chain-stoppers in a manner known per se.

Suitable diphenols of the formula (I) are e.g. hydroquinone, resorcinol, 4,4'-dihydroxydiphenol, 2,2-bis-(4-hydroxyphenyl)-propane (bisphenol A), 2,4-bis-(4-hydroxyphenyl)-2-methylbutane, 2,2-bis-(4-hydroxy-3,5-dimethylphenyl)-propane, 1,1-bis-(4-hydroxyphenyl)-cyclohexane or 1,1-bis-(4-hydroxyphenyl)-3,3,5-trimethylcyclohexane. Preferred diphenols of the formula (I) are 2,2-bis-(4-hydroxylphenyl)-propane and 1,1-bis-(4-hydroxyphenyl)-3,3,5-trimethylcyclohexane. Mixtures of diphenols may also be used, e.g. of bisphenol A and up to 60 mol-% of 1,1-bis-(4-hydroxyphenyl)-3,3,5-trimethylcyclohexane.

Suitable chain stoppers are e.g. phenol or p-tert.-butylphenol, or else long-chain alkylphenols such as 4-(1,3-tetramethyl-butyl)-phenol in accordance with DE-OS 2 842 005 or monoalkylphenols or dialkylphenols with a total of 8 to 20 carbon atoms in the alkyl substituents in accordance with German patent application 3 506 472, such as, for instance, p-nonylphenol, 2,5-di-tert.butylphenol, p-tert.-octylphenol, p-dodecylpheno,2-(3,5-dimethylheptyl)-phenol and 4-(2,5-dimethylheptyl)-phenol. The amount of chain-stoppers used is generally between 0.5 and 10 mol-%, with respect to the sum of each of the diphenols (I) used.

Suitable polycarbonates in accordance with component A) according to the invention may be branched in a known manner, in fact preferably by incorporating 0.05 to 2.0 mol-%, with respect to the sum of the diphenols used, of tri-functional or more than tri-functional compounds, e.g. those with three or more than three phenolic OH groups.

Suitable polycarbonates according to the invention have mean weight average molecular weights $\overline{M}_w$ (measured e.g. by ultracentrifuging or light scattering measurements) of 10,000 to 200,000, preferably of 20,000 to 80,000.

Component B

The dimeric fatty acid polyesters are known and are described in DE-OS 4 132 079. The dimeric fatty acid polyesters are branched polyesters with phenolic OH groups and with mean number average molecular weights $\overline{M}_w$ (measured by gel chromatography) of 400 to 200,000, preferably 2,000 to 100,000 and in particular 3,000 to 50,000. The polyesters are prepared by reacting $C_{36}$ to $C_{44}$ dimeric fatty acids with dialcohols by the known transesterification method, wherein 0.5 to 10, preferably 1 to 5 mol-% of branching agents and 1 to 20, preferably 3 to 20 mol-% of hydroxyarylcarboxylic acids or their esters with $C_1$–$C_6$-alcohols are used as chain-stoppers, each being with respect to the moles of dimeric fatty acid.

Instead of the dicarboxylic acids, their anhydrides or alkyl esters may be used for polyester synthesis, in a way known per se.

Preferred dicarboxylic acids are $C_{36}$ and $C_{44}$ dimeric fatty acids, which may also contain up to 20 wt. % of mono or tricarboxylic acids or unsaturated acids.

Suitable dialcohols are any aliphatic or cycloaliphatic glycols which also have aromatic groups incorporated such as (oligo)ethylene glycol, (oligo)propylene glycol- (1,2) and (1,3), butylene glycol-(1,4) and (2,3), hexanediol-(1,6), octanediol-(1,8), neopentyl glycol, cyclohexanedimethanol, (1,4-bis-hydroxymethylcyclohexane), 2-methyl-1,3-propanediol, trimethylolpropane monoallyl ether, polyallyl glycidyl ether, or copolymers of allyglycidyl ether with propylene oxide or ethylene oxide, glycerine monoallyl ether or OH-terminated, bis-functional rubber oligomers such as e.g. dihydroxyoligobutadiene and bis-2,3-(4-hydroxyethoxyphenyl)-propane. Hexanediol-(1,6), butylene glycol-(1,4) and neopentyl glycol are preferred.

Suitable branching agents are polyalcohols with 3 or more alcoholic OH groups, polycarboxylic acids with 3 or more carboxylic acid substituents, hydroxycarboxylic acids with aliphatic OH and carboxylic acid functions, wherein at least 3 of these functions must be present.

Examples of these are trimethylolpropane, pentaerythritol, trimethylolethane, glycerine, diglycerine, bismethylolpropene, bispentaerythritol, 1,2,6-trihydroxyhexane, mannitol, sorbitol, trimesic acid, trimellitic acid, citric acid, tartaric acid, trimeric fatty acids, preferably trimethylolpropane or pentaerythritol.

Suitable phenolic chain stoppers are hydroxyarylcarboxylic acids such as, for example, p-hydroxybenzoic acid, m-hydroxybenzoic acid, salicylic acid, 4-hydroxycinnamic acid, 3-hydroxycinnamic acid or phloretic acid or their esters with $C_1$–$C_6$-alcohols. Preferably, m or p-hydroxybenzoic acids or their esters with $C_1$–$C_6$-alcohols are used.

In addition to chain stoppers to be used according to the invention, aliphatic or aromatic monocarboxylic acids or their esters with aliphatic alcohols may also be used as chain stoppers. Suitable monocarboxylic acids are stearic acid, oleic acid, linoleic acid, linolenic acid, benzoic acid or tert.-butylbenzoic acid.

Suitable catalysts for preparing polyesters are known transesterification catalysts such as, for example, tin compounds or titanium compounds.

The polyesters are prepared by mixing the components, wherein the reaction proceeds with or without transesterification catalysts, in fact at temperatures of 150° to 250° C., preferably 180° to 220° C. and with a reaction time of 2 to 20 hours. In this case, lower molecular weight substances are distilled off and a vacuum of 0.2 to 100 mbar is preferably applied for a period of 0.5 to 6 hours, at the end of the reaction.

Polyisobutylenes in accordance with component C) in the present invention are cationic polymers of olefins and optionally dienes with a concentration of at least 85% of isobutylene. Polyisobutylenes are described under the key word "Polyisobutylene" on page 3539, vol. 5 in Römpp Chemie Lexikon, 9th ed., 1992, Georg Thieme Verlag. The molecular weight of polyisobutylenes to be used according to the invention is 10,000 to 5,000,000, preferably 100,000 to 1,200,000 g/mol. This is determined by light scattering.

Dienes which are suitable as comonomers for isobutylene are for example, butadiene, isoprene, 2-chlorobutadiene-(1,4), 2-bromobutadiene-(1,3), pentadiene, hexadiene, 2-ethylbutadiene-(1,3), 2-propylbutadiene-(1,3), 2-phenylbutadiene-(1,3), 2-methylpentadiene-(1,3) or 3-propylhexadiene.

Other suitable olefinic comonomers are styrene, α-methylstyrene, m/p-methylstyrene or divinylbenzene.

This type of product is obtainable commercially as butyl rubber.

Component D in the context of the invention is silicones such as are described in Houben-Weyl, Methoden der Organischen Chemie, 4th ed., E20, part 3, pages 2211–2232. These are polydialkylsiloxanes and/or polyalkylarylsiloxanes and/or polydiarylsiloxanes, preferably polydialkylsiloxanes, in particular polydimethylsiloxanes. The polysiloxanes in general have an average molecular weight of 100,000 to 10,000,000, preferably 400,000–5,000,000.

Component E in the context of the invention is branched or unbranched mixtures of hydrocarbons which are preferably liquid and have a boiling point which is above 360° C. Mineral oils are described in Römpps Chemie Lexikon, vol. 4, 8th ed., Frankh'sche Verlaghandlung, Stuttgart, page 2622 and paraffin oils are described under the keyword "Paraffin" in Römpps Chemie Lexikon, vol. 4, 8th ed., Frankh'sche Verlaghandlung, Stuttgart, page 2991.

The preferred mineral oils are aliphatic and have a boiling point>360° C.

Moulding compounds according to the invention may also contain conventional additives such as lubricants and mould release agents, flow control agents, nucleating agents, antistatic agents, stabilisers, fillers and reinforcing agents as well as colorants and pigments. Preferred reinforcing agents are glass fibres, preferred fillers are glass beads, mica, quartz, talc or wollastonite and preferred pigments are carbon black and titanium dioxide.

Thermoplastic moulding compounds according to the invention are prepared by mixing the particular components in a known way and melt-compounding at temperatures of 220° C. to 360° C. in conventional equipment such as internal mixers, extruders or double-shafted screws or solutions of components A)–E) are evaporated together in a vaporising extruder.

The invention thus also provides a method for producing thermoplastic polycarbonate moulding compounds consisting of components A) to E), which is characterised in that the particular components mentioned above are mixed in a known way and then melt-compounded or melt-extruded in conventional equipment at temperatures of 220° C. to 360° C. or solutions of components A)–E) are evaporated together in a known way and then melt-compounded or melt-extruded in conventional equipment at temperatures of 220° C. to 360° C. or solutions of components A)–E) are evaporated together in a vaporising extruder, wherein the components A)–E) are dissolved, separately or together, in organic solvents such as, for instance, toluene, xylene, chlorobenzene, mesitylene, methylene chloride, ligroin or cyclohexane, preferably chlorobenzene and/or methylene chloride, the solutions are mixed and they are evaporated on a vaporising extruder under a vacuum (0.5–100 mbar), wherein melt temperatures of 250°–380° C. are achieved.

The invention also provides use of the thermoplastic moulding compounds to produce moulded items and the moulded items produced therefrom.

Mixtures according to the invention can be processed by extrusion or injection moulding to give moulded items which are characterised by improved toughness at low temperature and by resistance to petrol.

Mixtures according to the invention are characterised by an improved toughness and are used to produce impact resistant housings for electrical equipment, domestic appliances, toys and in the construction of automobiles.

The silicone-containing mixtures are characterised by extremely high resistance to low temperatures and may be used in all sectors of refrigeration engineering.

EXAMPLES

Components

The polycarbonate used is a bisphenol A polycarbonate with a relative solution viscosity of 1.28 (measured in a 0.5% strength solution in methylene chloride at 20° C.).

The dimeric fatty acid polyester (Dim polyester) used is a phenolic hydroxy functional, branched dimeric fatty acid polyester in accordance with DE-OS 4 132 079, example A1.

288.5 g (0.5 mol) of a $C_{36}$ dimeric fatty acid, 50 g (0.5 mol) of adipol (1,6-hexanediol), 6.9 g (0.05 mol) of 4-hydroxybenzoic acid, 2.7 g (0.02 mol) of trimethylolpropane, 0.2 g of hydroquinone and 0.2 g of dibutyltin oxide are mixed. The mixture is heated at 180° C. for 2 h and at 220° C. for 4 h, when 303.57 g of dimeric fatty acid polyester with a phenolic OH content of 0.35%, an OH value (aliphatic OH) of 16 and an acid value of 4 is obtained.

The PIB rubber used is a polyisobutylene with 2% of isoprene as comonomer and a molecular weight of 400,000.

The silicone used is a polydimethylsiloxane with a molecular weight of 2,000,000.

The mineral oil used is a mineral oil from the Aldruck Co., obtainable under the name White, heavy (boiling point>360° C.).

Test conditions

Stress cracking behaviour was tested using bars with the dimensions 80×10×4 mm. The test medium used was a mixture of 50 vol-% toluene and 50 vol-% isooctane. The test sample was pre-stretched using an arc-shaped jig (preliminary extension 1%) and stored in the test medium at room temperature. Stress cracking behaviour was assessed by the formation of cracks or by fracturing as a function of the exposure time in the test medium.

The notched impact strength was determined according to ASTM D 256.

A mixture of polycarbonate and dimeric polyester (Dim masterbatch) was prepared and this was then mixed with the other components.

Producing a Dim masterbatch 1,800 g of polycarbonate and 200 g of Dim polyester were dissolved in a mixture of 4 l of chlorobenzene and 8 l of methylene chloride and the solution was evaporated in a vaporising extruder (ZSK 32 with a vacuum fitting) at 280° C.

Example 1 (according to the invention)

1440 g of polycarbonate and 400 g of the Dim masterbatch are dissolved in 2.5 l of chlorobenzene and 8 l of methylene chloride and 160 g of polyisobutylene in 1440 g of chlorobenzene were added to the solution and the solution of components was evaporated in a vaporising extruder (ZSK 32 with vacuum fitting) at 280° C. The mixture contains 90 wt. % of polycarbonate, 2 wt. % of DIM polyester and 8 wt. % of polyisobutylene.

A material which exhibited ductile fracture at −20° C. and produced no cracks in the stress cracking test was obtained.

Example 2 (according to the invention)

1840 g of the Dim masterbatch is dissolved in 2.5 l of chlorobenzene and 8 l of methylene chloride and 160 g of polyisobutylene in 1440 g of chlorobenzene is added to the solution and the solution of components is evaporated in a vaporising extruder (ZSK 32 with vacuum fitting) at 280° C. The mixture contains 82.2 wt. % of polycarbonate, 9.2 wt. % of Dim polyester and 8 wt. % of polyisobutylene.

A material which exhibited ductile fracture at −30° C. and produced no cracks in the stress cracking test was obtained. No cracks appeared even after 20 minutes exposure.

Example 3 (according to the invention)

1440 g of polycarbonate and 400 g of Dim masterbatch are dissolved in 4 l of chlorobenzene and 6.5 l of methylene chloride and then 160 g of silicone in 1.5 l of methylene chloride are added to the solution and the solution of components is evaporated in a vaporising extruder (ZSK with a vacuum fitting) at 280° C.

The mixture contains 90 wt. % of polycarbonate, 2 wt. % of Dim polyester, 8 wt. % of silicone.

A material which exhibits ductile fracture at −60° C. and produced no cracks in the stress cracking test is obtained.

Example 4 (according to the invention)

1440 g of polycarbonate and 400 g of Dim masterbatch are dissolved in 4 l of chlorobenzene and 6 l of methylene chloride and then 80 g of silicone in 1 l of methylene chloride and 80 g of polyisobutylene in 720 g of chlorobenzene are added to the solution and the solution of components is evaporated in a vaporising extruder (ZSK 32 with a vacuum fitting) at 280° C.

The mixture contains 90 wt. % of polycarbonate, 2 wt. % of Dim polyester, 4 wt. % of polyisobutylene and 4 wt. % of silicone.

A material is obtained which has a ductile/brittle transition at −60° C. and produces no cracks in the stress cracking test.

Example 5 (according to the invention)

1560 g of polycarbonate and 400 g of Dim masterbatch are dissolved in 2.5 l of chlorobenzene and 8 l of methylene chloride, 40 g of mineral oil are added thereto and the solution of components is evaporated in a vaporising extruder (ZSK 32 with a vacuum fitting) at 280° C.

The mixture contains 96 wt. % of polycarbonate, 2 wt. % of Dim polyester, 2 wt. % of mineral oil.

A material which exhibits ductile fracture at −40° C. is obtained.

After heating for 50 hours at 130° C. in a vacuum (20 torr), no loss in weight and no optical changes (sweating) are observed.

We claim:

1. Thermoplastic moulding compounds containing
   A) 65–96.5 of aromatic polycarbonate,
   B) 0.5 to 20 wt. % of phenolic hydroxy functional branched dimeric fatty acid polyester,
   and at least one component selected from
   C) 1–25 wt. % of polyisobutylene,
   D) 1–25 wt. % of silicone oil,
   E) 1–25 wt. % of mineral oil,
   wherein the sum of A+B+C+D+E is 100.

2. Thermoplastic moulding compounds according to claim 1 containing 80–95 wt. % of aromatic polycarbonate, 1–10 wt. % of dimeric fatty acid polyester and at least one component selected from 4–10 wt. % of polyisobutylene, 4–10 wt. % of silicone oil, 4–10 wt. % mineral oil.

3. A process for preparing thermoplastic moulding compounds in accordance with claim 1, wherein the particular components are mixed and melt-compounded at temperatures of 220° to 360° C. or solutions of components A)–E) are evaporated in a vaporising extruder.

4. Moulded items prepared from moulding compounds in accordance with claim 1.

\* \* \* \* \*